Figure 1:
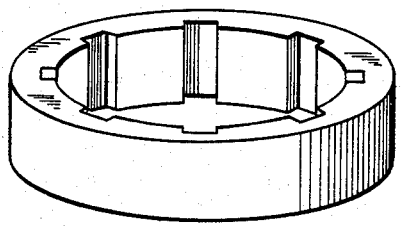

United States Patent [19]

Zöllner et al.

[11] Patent Number: 4,534,836
[45] Date of Patent: Aug. 13, 1985

[54] USE OF TEMPERATURE AND CORROSION RESISTANT GASTIGHT MATERIALS AS GUARD ELEMENTS FOR THE METAL PORTION OF COMBINATION ELECTRODES IN THE WINNING OF METALS BY MOLTEN SALT ELECTROLYSIS

[75] Inventors: Dieter H. Zöllner; Christine Zöllner, both of Schwaig b. Nürnberg; Franz Schieber, Röthenbach an der Pegnitz; Inge Lauterbach-Dammler, Nuremberg; Konrad Koziol, Röthenbach an der Pegnitz, all of Fed. Rep. of Germany

[73] Assignee: C. Conradty Nürnberg GmbH & Co., KG, Röthenbach a.d. Pegnitz, Fed. Rep. of Germany

[21] Appl. No.: 479,276

[22] Filed: Mar. 28, 1983

[30] Foreign Application Priority Data

Apr. 26, 1982 [DE] Fed. Rep. of Germany ....... 3215537

[51] Int. Cl.³ .......................... C25C 3/02; C25C 3/04; C25C 3/06; C25C 7/00
[52] U.S. Cl. ..................................... 204/67; 204/68; 204/70
[58] Field of Search ........... 204/243 R, 294, 64 R–71, 204/279, 286

[56] References Cited

U.S. PATENT DOCUMENTS

| | | | |
|---|---|---|---|
| 3,745,107 | 7/1973 | Jacobs | 204/286 |
| 3,960,678 | 6/1976 | Alder | 204/67 |
| 4,111,765 | 9/1978 | DeNora et al. | 204/67 |
| 4,308,114 | 12/1981 | Das et al. | 204/67 |
| 4,376,029 | 3/1983 | Joo et al. | 204/294 |
| 4,417,097 | 11/1983 | Das | 204/279 |
| 4,474,613 | 10/1984 | Zollner et al. | 204/286 |

Primary Examiner—Howard S. Williams
Attorney, Agent, or Firm—James J. Ralabate

[57] ABSTRACT

Temperature and corrosion resistant materials as guard elements for the metal part of combination electrodes for molten flow electrolysis, which consists of a composite material made from a carbon component containing graphitic structural elements, and a component having at least one ceramic. The guard elements thus formed have long service lives and allow trouble-free electrolysis for the extraction of metals.

51 Claims, 2 Drawing Figures

U.S. Patent        Aug. 13, 1985        4,534,836

USE OF TEMPERATURE AND CORROSION RESISTANT GASTIGHT MATERIALS AS GUARD ELEMENTS FOR THE METAL PORTION OF COMBINATION ELECTRODES IN THE WINNING OF METALS BY MOLTEN SALT ELECTROLYSIS

The present invention relates to the use of temperature and corrosion resistant gastight materials as guard elements for a metal portion of a combination electrode in molten salt electrolysis for the winning of metals.

By molten flow electrolysis processes are meant in particular methods for the winning of metals such as aluminum, magnesium, sodium, lithium etc. which due to negative potential cannot be separated from aqueous solutions. The use of combination electrodes which consist of an electrode holder with an active portion affixed thereto for operations in molten salt electrolysis is known. The metallic holder serves not only to secure the active portion mechanically but also serves as the current supply. Further from German Offenlegungsschrift No. 24 25 136 non-consumable anodes for molten salt electrolysis are already known in which by local cooling a slag layer is formed on the unprotected current supply and the unprotected anode, or the uncooled anode arrangement is screened by an electrically insulating material resistant to the electrolytes.

Further, from German Offenlegungsschrift No. 29 10 811 a new current feed device is known for electrodes, especially for electrodes immersed in a corrosive salt melt, with the following components:

a graphite tube penetrating through the wall or ceiling of a furnace or cell which tube is open at both ends, and projects into a bore of the electrode;

a metallic current conductor arranged to be supplied to this graphite tube made of a metal whose melting point is below the temperature of the salt melt and which forms a fluid contact with said electrode at the operating temperature of the furnace or of the cell;

a protective tube surrounding the graphite tube, which is tightly embedded in one end of the electrode and at the other end is led through the ceiling or wall and is made of a dense electrically non-conductive ceramic material, which is stable under the operating conditions.

These designs, like the constructional solutions in the field of electrodes for the production of electrosteel, have the disadvantage that the materials of oxide ceramics or refractory nitrides show very low heat conductivity and a very unfavorable modulus of elasticity so that under load caused by spatial or temporal temperature gradients they easily crack.

Further from Alcoa's British Patent No. 1 415 305 a conductor device is known for aluminum production which comprises a metallic conductor with a muff made of a chlorine resistant material. The material disclosed is graphite with a protective layer of pyrolytic graphite. But graphite and other carbon materials are so strongly attacked by the smelt and the electrolysis products that the high rate of graphite consumption impedes economical execution of the process.

An object of the invention is to provide guard elements for a metal portion of a combination electrode for molten salt electrolysis for the extraction of metals, which has long service life and ensures adequate protection of the electrode for practical electrolysis cell operations, and simultaneously permits energy-saving operation of the electrode, without mechanical handling, including the insertion and removal of the electrode into and out of the cell, being hindered.

The invention contemplates the use of a composite material comprising a carbon component containing structural elements of graphite and at least one ceramic oxide component.

In the composite material, the carbon share is generally contained in an amount of from about 20 to 80% by weight, while the ceramic component forms the remainder of the coating. Within the scope of the invention, it is especially advantageous when the carbon material is present in an amount of from 35 to 60% by weight, a specially favorable range being approximately from 40 to 55% by weight.

Apart from the carbon material and the ceramic components, the composite material can also contain binding agents, impregnating agents and similar ancillary substances which in general can form up to about 15% of the total weight of the material. Even though such binding agents, impregnating agents and the like are not always necessary, it has frequently been found advisable depending on the choice of the carbon and ceramic components to use binding agents and impregnating agents in an amount of about 1 to 9% by weight, based on the weight of the total material. The binding agent and impregnating agent can serve to produce a denser, more cohesive material relatively free of pores for one component, e.g. the carbon material, or can be used for favorable binding between the carbon component and the ceramic component. As the binding and impregnating agents for example, consideration can be given to the conventional agents used in the manufacture of electrographites based on premium coke, of which e.g. pitch, tar, coal tar, phenol resin etc. should be mentioned.

But the composite material can also be made from ceramic components which at least partially have binding properties themselves, e.g. plastic highly refractory clays etc.

Within the scope of the invention, it is preferred that the carbon component of the composite material has structural elements of graphit which in general form about 25 to 90% by weight of the carbon share. As a rule, favorable results are obtained when the proportion of the graphitic structural elements in the carbon component is in the range of from 40 to 80% by weight based in the carbon component.

Within the scope of the invention and depending on the demands to which the electrode is subjected during electrolysis, there are various possibilities for the choice of the carbon component. Thus for example the graphitic structural elements can be formed of natural graphite or of electrographite or of mixtures of the two. The non-graphitic shares found in the carbon component are based on anthracite, pit coke, petroleum coke, coal tar coke, carbon black etc. and therefore the carbon component can form e.g. a mixture of graphite of varying origin with anthracite, coke of varying specifications etc..

When using natural graphite such qualities are preferable which are devoid of low-melting shares of impurities or of such additives as those which form gaseous products with oxygen at high temperatures or may emit such products, e.g. pyrites, carbonates which decompose at high temperatures etc..

However it is not necessary under all conditions that the carbon component should contain graphitic structural elements, so that in individual cases the carbon material can also be free thereof. This will be considered when the electrode is subjected to less rough operations in the electrolysis cell. In general the service life can be prolonged and better thermal transition values, thermoshock-, thermostress-resistance and lower slag adherence can be attained when higher shares of graphite are present in the composite material. This can be co-regulated on the one hand by the type of the carbon component and on the other by the amount of it which is used.

Within the scope of the invention, especially favorable guard elements contain preferably about 30 to 50% by weight of graphitic structural elements, based on the total weight of the composite material. However as mentioned above, depending on the operating conditions, it is often possible to attain satisfactory results when the graphite components based on the composite material are outside the limits preferred above.

The ceramic component can in general be present in an amount of about 20 to 80% by weight, based on the weight of the composite material, while amounts in the range from 40 to 65% by weight have produced especially favorable results.

In general the composite material contains the carbon component as well as the ceramic component as particle composites, or fiber composites or interlaminar composites, with highly homogenous distribution. This can as a rule achieve a ceramic "matrix" in which the carbon share is embedded with good distribution. Thus the high temperature properties of the two components complement each other in a favorable manner, resulting in a surprisingly high resistance to temperature changes and mechanical strength of the materials. However in individual cases it is also possible when manufacturing the composite material to work toward a deliberate heterogeneousness of the individual component, even though this is only of value for special purposes.

The composite material to be used in the invention can be produced in the most varied ways, while as a rule the conventional methods for the manufacture of composite materials, taking account of the peculiarities of the highly refractory, i.e. ceramic components and the carbon components, are applicable.

A typical modus operandi for the manufacture of the composite material is that the initial components, i.e. the carbon component as well as the ceramic component, optionally with the addition of water and binding agents, are mixed, then formed and then baked. The addition of water is often advisable since it facilitates the kneading of the substance until it is wholly homogenous.

In individual cases, depending on the type of the addition of the ceramic component as well as its quantity, a maturing period can follow in which the substances can be left over a period of from several hours up to some weeks, optionally in an atmosphere of high humidity.

After the mixing as well as the optional maturing process, in general there follows the forming of the material, which e.g. can be done by pressing, stamping or by casting. Within the scope of the invention special preference is given to forming the guard elements as molded bodies which are detachably positioned on the metal portion of the combination electrode. They can be e.g. tubes, tubular selctions, rings and sectors thereof. These individual molded bodies can be designed in a special manner to attain an especially favorable covering of the metal shaft. With respect to the construction of such detachably mountable molded bodies we draw attention to the older German patent application No. P 31 02 776.8, the relevant contents of which should be regarded as being introduced here. As regards the general construction of combination electrodes of the type described here, lastly reference is made to the European patent applications Nos. 0050679, 0050680 and 0050681, from which the general design of the combination electrodes as well as their usable active portions etc. emerges, to which reference is made for the purposes of this invention as well.

The profiling of such detachably mountable molded bodies can also be attained by special techniques wherein mention should here be made of vibration molding and extrusion.

Within the scope of the invention, special preference is given to a composite material containing the carbon particles in predominantly anisotropic alignment. A preferred orientation in the longitudinal direction becomes possible by the following processes: extrusion, continuous vibration, isostatic pressing with displaceable mold, manual shaping and centrifugal casting. The use of such prefabricated composite material, in which the carbon particle is predominantly contained in the longitudinal direction, provides, with parallel alignment to the electrode axis, better oxidation and corrosion stability, as well as good ablation properties.

The composite material used according to the invention can however also contain carbon particles in the transverse direction which can be attained e.g. by block pressing, stamping, rippling, cold and hot isopressing, vibration, casting and injection. Especially favorable orientations which lead to increased thermal conductivity and mechanical strength of the molded body are attained by rippling or by vibration.

According to a preferred embodiment of the invention, the composite material has a thermal conductivity of less than 210 kJ/mhK. (Kilojoules per meter, hour and Kelvin).

The baking of the composite substance is done in general at temperatures of up to 1600° C, preferably 1200° to 1400° C., in which connection with baking and sintering temperatures above about 500° C., care has to be taken to avoid access of fresh air or of air circulation in general. In some cases, the baking can be done in several stages, while one baking stage at a lower temperature can in certain circumstances follow one at a higher temperature. For example with composite materials of graphite and MgO a prebaking stage in the range from 900° to 1400° C. is used, which can be followed depending on the share of MgO in terms of quantity by rebaking at a higher temperature. In general it is desirable to precede the baking process with a predrying stage at a substantially lower temperature to drive out any residual humidity and to raise the temperature to achieve the baking only over lengthy periods.

To make the protective element gastight, the material is sintered up to a porosity of at least 90%, preferably more than 95% density.

The ceramic component containing composite materials used according to the invention can be chosen from a broad spectrum of highly refractory compositions. In general they include the refractory oxides, carbides and nitrides as well as mixtures thereof. For example combinations of oxides or silicates of Zr, Al or Mg and/or nitrides of Ti, Si, boron compounds of Ti or Zr or carbides of Si, Zr or Ti. As the ceramic component in the composite material used in the invention, in particular fireclay, clay, kaolin, silicon dioxide, sillimanite, Al$_2$O$_3$, MgO, sinterdolomite, magnesium-chromoxide ore forsterite, silicon carbide, silicon nitride, tantalum oxide, tin oxide zirconium oxide, zirconium silicate, titanium oxide, aluminum titanate containing silicate, spinels, and mixtures thereof have proven to be beneficial. Special preference is given here to the use of refractory clays, MgO, silicon carbide and silicon nitrides as well as aluminum titanate containing silicate.

Alternative solutions use materials in which at least one of the ceramic component is selected from among the mixed oxides of aluminum oxide, silicon nitride, zinc oxide or mullite with about 15% of zirconium oxide. These ceramics show especially low brittleness, which in particular increases the service life of the surface protective element in the automatic crust breaking devices in modern aluminum electrolysis.

With one modification according to the invention of the surface protective element which comprises the use of mixed oxides of doped tin oxide with titanium oxide or magnesium oxide or aluminum oxide or zirconium oxide, especially corrosion resistant properties are imparted to the electrolyte components. To the extent that it is desirable, the ceramic and/or the carbon component can be present at least partially in fiber form, e.g. as kaolinite fiber, asbestos fiber, carbon fiber, especially chopped carbon fiber, etc. Moreover the above-named ceramic component can have additives of boroxides and/or highly refractory rare earth metal compounds inserted in them.

The combination of the ceramic component as well as the carbon component is preferably controlled depending on type and amount as well as their subsequent pressing and sintering so that the composite material has a thermal expansion coefficient of less than $15 \times 10^{-6}$/K. The preferred composite materials of the invention have a thermal expansion coefficient in the range from $(2-12) \cdot 10^{-6}$/K. (Kelvin).

The materials used according to the invention are especially useful as detachable molded bodies mountable on a metal shaft of an electrode which can be e.g. tubes, rings, segments or sectors thereof. The molded bodies, according to a preferred embodiement of the invention, are mounted on the electrode or abutting it by covered screw connections, threads etc.. It is often especially important that at least the lower part of the metal shaft of the electrode which is inserted in the electrolysis cell should be wholly covered by the materials used according to the invention. Further the outer protective area of the molded bodies should be free of easily fusible elements for support or spacers.

The materials used in the invention have a special application to combination electrodes, the metal shaft of which is internally cooled. Such materials are especially suitable for this purposes since their preferred range of heat conductivity allows an optimal removal of the heat arising on the protective elements.

Within the scope of the invention, the molded parts as such also comprise guard rings, tubes, sectors or segments which are made of the proposed composite material. Therefore the above specification refers in its full scope to such molded bodies, e.g. as tubes, rings, or ring sectors.

FIG. 1 of the accompanying drawings shows a cover ring which has on its inside guides for positioning on the metal portion of the combination electrode.

Figure 2:
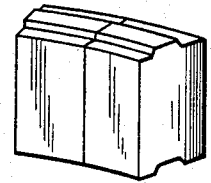

FIG. 2 shows the segment or sector of a guard ring by means of which a complete cover for the metal shaft can be achieved by the combination of a plurality of corresponding elements. They can be secured for example via an inner thread (not shown) on the electrode.

The invention achieves a number of surprisingly effects. The protective coatings combine the good oxidation and corrosion resistance of the ceramic component whith the good thermal properties of the graphite, and thereby attain very long service life since there is no consumption due to fracture or to oxidation. They are less brittle than purely ceramic materials, so that they withstand the mechanical loads in electrolysis. Due to the graphite share they are better heat conductors, so that they are less sensitive to the thermal loads during start-up, charging the cell, etc.. The same good properties are also attained by the preference given to materials with low thermal expansion coefficients. The consumption by oxidation is practically negligible. Due to the design of the guard elements as detachably mounted molded bodies there is finally a construction which is easy to maintain and to repair.

The invention will be described below in examples which however should not be interpreted as limiting the scope of the invention.

EXAMPLE 1

An electrode was used whose top portion consisted of copper which was cooled by a system of supply and return channels with water. On the copper shaft the lower portion of graphite was screwed via a graphite nipple.

The part of the copper shaft inserted in the electrolysis cell was wholly covered by three mutually joined rings, the lowest of which was screwed by an internal thread to the lower part of the copper shaft.

Tests with combination anodes of the type above in molten cryolite electrolytes have shown that the ohmic voltage drop at a current density of 10 kA/m$^2$ is from 0.2 to 0.3 V below that of the conventional block anodes. This voltage advantage remained unchanged during tests which lasted more than 3 months.

The composite material forming the guard rings was made of 49% by weight of natural graphite (from Sri Lanka), 37% by weight of natural clay (of a composition of about 56% SiO$_2$, 33% Al$_2$O$_3$, 1.5% FeO, 0.9% CaO+MgO, 1.4% alkali and the remainder moisture), 6% SiC and the remainder quartz sand.

The initial materials were ground dry and were mixed in the pan grinder for some hours with addition of mixing water.

Thereafter the material was left for some weeks at room temperature and then pressed into the desired ring shape. The finished rings were then dried at about 110° to 140° C. and then slowly baked in a muffle furnace at a temperature in the region of 1370° C.

EXAMPLE 2

The composite material was manufactured analogously by homogenization forming, drying and baking of the following initial materials:

| | |
|---|---|
| zirconium oxide | 8% by weight |
| sinter corundum and molten Al$_2$O$_3$ | 43% by weight |
| bituminous coke | 22% by weight |
| Alabama graphite | 27% by weight |

EXAMPLE 3

| silicon carbide | 71% by weight |
|---|---|
| electrographite with ca. 70% of graphite structure elements | 25% by weight |

Residue of carbon (coal tar as the binding agent).

EXAMPLE 4

| MgO (electrosmelted) | 39% by weight |
|---|---|
| Alabama graphite | 20% by weight |
| anthracite | 31% by weight |

Residue of magnesium oxide-magnesium chloride as the binding agent.

EXAMPLE 5

| aluminum silicate e.g. in fiber form ("fiberfrax" trademark of the Carborundum Co., Niagara Falls, USA) | 36% by weight |
|---|---|
| premium petroleum coke | 37% by weight |
| phenol-formaldehyde resin | 7% by weight |

The homogenized materials were suspended with a little water and then vacuum pressed. After drying for 2 hours in the range from 170° to 190° C., the material was baked in the range from 500° to 600° C.

EXAMPLE 6

| $Al_2O_3$ | 39% by weight |
|---|---|
| $TiO_2$ | 28% by weight |
| kaolin | 3% by weight |
| magnesium silicate | 0.5% by weight |
| chopped carbon fibers | 11% by weight |

The remainder was petroleum coke of carbon (coal tar as the bindings agent).

The guard rings made analogously from the above compositions made possible trouble-free operation of the electrodes with simultaneously long service lives.

EXAMPLE 7

| tin oxide | 50% by weight |
|---|---|
| zirconium oxide | 7% by weight |
| $TiO_2$ (from titanic acid ester) | 5% by weight |
| natural graphite | 30% by weight |
| carbon from coal tar | 8% by weight |

The substance is suspended with polyviol solution and kneaded for 2 hours, isostatically pressed at 2000 kg/cm$^2$ and sintered for 5 hours at 1250° C.

We claim:

1. In the winning of metals by electrolysis in a molten salt system, use of a combination anode having a metal shaft portion protected by guard elements in form of detachably mounted moldings consisting of a composite material comprising at least one ceramic oxide component and a carbon component containing structural elements of graphite.

2. Use according to claim 1, wherein the carbon component of the composite material is present in an amount of about 20 to 80% by weight, and the ceramic oxide component forms the remainder of the composite material.

3. Use according to claim 1, wherein the carbon component of the composite material is present in an amount from 35 to 60% by weight.

4. Use according to claim 1, wherein said composite material contains binding agents and impregnating agents in a share of from together 1 to 15% by weight of the material.

5. Use according to claim 1, where the share of the structural elements of graphite in the carbon component is 25 to 90% by weight.

6. Use according to claim 1, wherein the structural elements of graphite are provided by natural graphite and/or electrographite.

7. Use according to claim 1, wherein the portion of the carbon component without the structural elements of graphite is provided by at least one of anthracite, furnace coke, coal tar pitch coke and petroleum coke.

8. Use according to claim 1, wherein the entire carbon component of the composite material is graphite.

9. Use according to claim 8, wherein the graphite is natural graphite.

10. Use according to claim 1, wherein the portion of the carbon component containing structural elements of graphite is from 25% to 90% by weight of the carbon share.

11. Use according to claim 1, wherein the ceramic oxide component is present in the composite material in an amount from 40 to 65% by weight.

12. Use according to claim 1, wherein the composite material comprising a carbon component as well as a ceramic oxide component is a particle composite, fiber composite or interlaminar composite in homogenous or heterogenous distribution.

13. Use acccording to claim 1, wherein the composite material is produced by the mixing of initial ceramic oxide- and carbon-providing materials, molding and firing, whereby the carbon particles are oriented in a main direction.

14. Use according to claim 1, wherein the composite material comprises fireclay, clay, kaolin, silicon dioxide sillimanite, aluminum oxide, magnesium oxide, magnesiumchromium-oxide ore forsterite, silicon carbide, silicon nitride, zirconium oxides, zirconium silicate, titanium oxide, silicate-containing aluminum oxide, or spinels and mixtures thereof.

15. Use according to claim 1, wherein the ceramic oxide component comprises at least one of tantalum oxide, tin oxide, doped tin oxide and mixed oxides consisting of tin oxide with at least one of titanium oxide, magnesium oxide, aluminum oxide, zirconium oxide and tantalum oxide.

16. Use according to claim 1, wherein at least one of the components of the composite material is present at least partially in fiber form.

17. Use according to claim 1, wherein the ceramic oxide component comprises an additive of at least one of the group consisting of boroxide and refractory rare earths.

18. Use according to claim 1, wherein the composite material has a thermal expansion coefficient less than $15 \times 10^{-6}$/K.

19. Use according to claim 1, wherein the ceramic oxide component is selected from mixed oxides of alumina, zinc oxide or mullite with about 15% by weight of zirconium oxide.

20. Use according to claim 1, wherein the composite material comprises refractory carbides and nitrides.

21. Use according to claim 1, wherein said moldings are present as a tube, ring or ring sector.

22. Use according to claim 1, wherein the moldings wholly cover the metal portion, which is inserted in the electrolysis cell whereby the outer protected area formed by the moldings is free of easily fusible support elements.

23. Use according to claim 1, wherein the composite material covers the metal shaft portion of the combination anode, which is internally cooled.

24. Use according to claim 1, wherein the composite material has a heat conductivity of less than 210 KJ/mhk.

25. Use according to claim 1, wherein the composite material contains the carbon particles predominantly in anisotrope alignment.

26. A guard element in form of a detachably mounted molding for covering a metal shaft of a combination anode for the electrowinning of metals in a molten salt system, wherein said guard element consists of a composite material comprising at least one ceramic oxide component and a carbon component containing structural elements of graphite.

27. In the electrowinning of metals in molten salt systems, use of temperature and corrosion resistant, gas-tight materials as guard elements in form of detachably mounted moldings for the metal shaft portion of a combination anode, said materials being composite materials comprising at least one ceramic oxide component and a carbon component containing structural elements of graphite.

28. Use according to claim 27 wherein the carbon component of the composite material is present in an amount of about 20 to 80% by weight, and the ceramic oxide component forms the remainder of the composite material.

29. Use according to claim 27, wherein the carbon component of the composite material is present in an amount from 35 to 60% by weight.

30. Use according to claim 27, wherein said composite material contains binding agents and impregnating agents in a share of from together 1 to 15% by weight of the material.

31. Use according to claim 27, where the share of the structural elements of graphite in teh carbon component is 25 to 90% by weight.

32. Use according to claim 27, wherein the structural elements of graphite are provided by natural graphite and/or electrographite.

33. Use according to claim 27, wherein the portion of the carbon component without the structural elements of graphite is provided by at least one of anthracite, furnace coke, coal tar pitch coke and petroleum coke.

34. Use according to claim 27, wherein the entire carbon component of the composite material is graphite.

35. Use according to claim 34, wherein the graphite is natural graphite.

36. Use according to claim 27, wherein the position of the carbon component containing structural elements of graphite is from 25% to 90% of weight of the carbon share.

37. Use according to claim 27, wherein the ceramic oxide component is present in the composite material in an amount from 40 to 65% by weight.

38. Use according to claim 27, wherein the composite material comprising a carbon component as well as a ceramic oxide component is a particle composite, fiber composite or interlaminar composite in homogenous or heterogenous distribution.

39. Use according to claim 27, wherein the composite material is produced by the mixing of initial ceramic oxide- and carbon-providing materials, molding and firing, whereby the carbon particles are oriented in a main direction.

40. Use according to claim 27, wherein the composite material comprises fireclay, clay, kaolin, silicon dioxide, stillimanite, aluminum oxide, magnesium oxide, magnesium-chromium-oxide ore forsterite, silicon carbide, silicon nitride, zirconium oxides, zirconium silicate, titanium oxide, silicate-containing aluminum oxide, or spinels and mixtures thereof.

41. Use according to claim 27, wherein the ceramic oxide component comprises at least one of tantalum oxide, tin oxide, doped tin oxide and mixed oxides consisting of tin oxide with at least one of titanium oxide, magnesium oxide, aluminum oxide, zirconium oxide and tantalum oxide.

42. Use according to claim 27, wherein at least one of the components of the composite material is present at least partially in fiber form.

43. Use according to claim 27, wherein the ceramic oxide component comprises an additive of at least one of the group consisting of boroxide and refractory rare earths.

44. Use according to claim 27, wherein the composite material has a thermal expansion coefficient less than $15 \times 10^{-6}/k$.

45. Use according to claim 27, wherein the ceramic oxide component is selected from mixed oxides of alumina, zinc oxide or mullite with about 15% by weight of zirconium oxide.

46. Use according to claim 27, wherein the composite material comprises refractory carbides and nitrides.

47. Use according to claim 27, wherein said moldings are present as a tube, ring or ring sector.

48. Use according to claim 27, wherein the moldings wholly cover the metal portion, which is inserted in the electrolysis cell whereby the outer protected area formed by the moldings is free of easily fusible support elements.

49. Use according to claim 27, wherein the composite material covers the metal shaft portion of the combination anode, which is internally cooled.

50. Use according to claim 27, wherein the composite material has a heat conductivity of less than 210 KJ/mhk.

51. Use according to claim 27, wherein the composite material contains the carbon particles predominantly in anisotrope alignment.

* * * * *